(12) United States Patent
Ichikawa et al.

(10) Patent No.: US 9,649,946 B2
(45) Date of Patent: May 16, 2017

(54) VEHICLE AND CONTACTLESS POWER SUPPLY SYSTEM FOR ADJUSTING IMPEDENCE BASED ON POWER TRANSFER EFFICIENCY

(71) Applicants: Shinji Ichikawa, Toyota (JP); Toru Nakamura, Toyota (JP); Kazuma Tokuyama, Kobe (JP)

(72) Inventors: Shinji Ichikawa, Toyota (JP); Toru Nakamura, Toyota (JP); Kazuma Tokuyama, Kobe (JP)

(73) Assignees: TOYOTA JIDOSHA KABUSHIKI KAISHA, Toyota (JP); FUJITSU TEN LIMITED, Kobe-shi (JP)

( * ) Notice: Subject to any disclaimer, the term of this patent is extended or adjusted under 35 U.S.C. 154(b) by 68 days.

(21) Appl. No.: 14/427,547

(22) PCT Filed: Sep. 5, 2013

(86) PCT No.: PCT/IB2013/001912
§ 371 (c)(1),
(2) Date: Mar. 11, 2015

(87) PCT Pub. No.: WO2014/041410
PCT Pub. Date: Mar. 20, 2014

(65) Prior Publication Data
US 2015/0224883 A1    Aug. 13, 2015

(30) Foreign Application Priority Data
Sep. 13, 2012    (JP) .................................. 2012-201491

(51) Int. Cl.
*H02J 7/00*    (2006.01)
*B60L 11/18*    (2006.01)
(Continued)

(52) U.S. Cl.
CPC ........... *B60L 11/182* (2013.01); *B60L 11/005* (2013.01); *B60L 11/14* (2013.01); *B60L 11/1803* (2013.01);
(Continued)

(58) Field of Classification Search
CPC .. H02J 5/005; H02J 50/00; H02J 50/10; H02J 7/0004; H02J 7/025; B60L 11/182; B60L 11/1833; B60L 11/1842; B60L 11/1861
(Continued)

(56) References Cited

U.S. PATENT DOCUMENTS 7,741,734 B2    6/2010    Joannopoulos et al.
2007/0222542 A1    9/2007    Joannopoulos et al.
(Continued)

FOREIGN PATENT DOCUMENTS

AU    2006269374 B2    10/2009
AU    2007349874 A2    1/2010
(Continued)

*Primary Examiner* — Nathaniel Pelton
(74) *Attorney, Agent, or Firm* — Oliff PLC

(57) ABSTRACT

A contactless power supply system contactlessly supplies electric power from a power transmitting device to a vehicle. The vehicle includes a power receiving unit contactlessly receiving electric power from the power transmitting device, an electrical storage device storing electric power received by the power receiving unit, and a vehicle ECU. The power transmitting device includes a power supply unit, a power transmitting unit contactlessly supplying electric power, supplied from the power supply unit, to the power receiving unit and a matching transformer used to adjust an impedance between the power supply unit and the power transmitting unit. The vehicle ECU is able to output, to the power transmitting device, a command to adjust the matching transformer, and sets an impedance of the matching transformer on the basis of a power transfer efficiency between (Continued)

the power transmitting unit and the power receiving unit while the electrical storage device is being charged.

9 Claims, 10 Drawing Sheets

(51) Int. Cl.
| | | |
|---|---|---|
| H02J 5/00 | (2016.01) | |
| H02J 7/02 | (2016.01) | |
| B60L 11/00 | (2006.01) | |
| B60L 11/14 | (2006.01) | |
| B60L 15/20 | (2006.01) | |

(52) U.S. Cl.
CPC ....... *B60L 11/1833* (2013.01); *B60L 11/1842* (2013.01); *B60L 11/1861* (2013.01); *B60L 15/2009* (2013.01); *H02J 5/005* (2013.01); *H02J 7/025* (2013.01); *B60L 2210/30* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60L 2240/545* (2013.01); *B60L 2240/547* (2013.01); *B60L 2240/549* (2013.01); *B60L 2240/70* (2013.01); *B60L 2240/80* (2013.01); *H02J 7/0004* (2013.01); *Y02E 60/721* (2013.01); *Y02T 10/645* (2013.01); *Y02T 10/70* (2013.01); *Y02T 10/7005* (2013.01); *Y02T 10/705* (2013.01); *Y02T 10/7022* (2013.01); *Y02T 10/7044* (2013.01); *Y02T 10/7072* (2013.01); *Y02T 10/7077* (2013.01); *Y02T 10/7241* (2013.01); *Y02T 10/7275* (2013.01); *Y02T 10/7291* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y04S 10/126* (2013.01)

(58) Field of Classification Search
USPC ........................................................ 320/108
See application file for complete search history.

(56) References Cited

U.S. PATENT DOCUMENTS

| | | | |
|---|---|---|---|
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0206791 A1* | 8/2009 | Jung | H02J 7/00 320/108 |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0244580 A1 | 9/2010 | Uchida et al. | |
| 2010/0253152 A1 | 10/2010 | Karalis et al. | |
| 2010/0264745 A1 | 10/2010 | Karalis et al. | |
| 2011/0163609 A1 | 7/2011 | Wada et al. | |
| 2012/0025626 A1 | 2/2012 | Komiyama | |
| 2012/0025761 A1 | 2/2012 | Takada et al. | |
| 2012/0149307 A1 | 6/2012 | Terada et al. | |
| 2012/0187771 A1 | 7/2012 | Kamata et al. | |
| 2012/0306433 A1* | 12/2012 | Kim | H02J 17/00 320/106 |
| 2013/0030615 A1 | 1/2013 | Ichikawa | |
| 2013/0037365 A1 | 2/2013 | Ichikawa | |
| 2013/0057207 A1 | 3/2013 | Ichikawa et al. | |
| 2013/0057208 A1 | 3/2013 | Takada et al. | |
| 2013/0063085 A1* | 3/2013 | Takada | B60L 11/182 320/108 |
| 2013/0119781 A1* | 5/2013 | Takada | B60L 11/182 307/104 |
| 2013/0257370 A1* | 10/2013 | Ichikawa | H02J 5/005 320/108 |
| 2013/0270925 A1 | 10/2013 | Tanaka et al. | |
| 2013/0313893 A1 | 11/2013 | Ichikawa | |
| 2014/0285030 A1 | 9/2014 | Nakamura et al. | |

FOREIGN PATENT DOCUMENTS

| | | |
|---|---|---|
| AU | 2010200044 A1 | 1/2010 |
| AU | 2006269374 C1 | 3/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| CN | 102300744 A | 12/2011 |
| EP | 2130287 | 12/2009 |
| EP | 1902525 B1 | 11/2014 |
| IN | 735/DELNP/2008 | 9/2008 |
| IN | 6195/DELNP/2009 | 2/2010 |
| JP | 2009-501510 A | 1/2009 |
| JP | 2010-239769 A | 10/2010 |
| JP | 2011-142748 A | 7/2011 |
| JP | 2011-193671 A | 9/2011 |
| JP | 2011-244530 A | 12/2011 |
| JP | 2011-250555 A | 12/2011 |
| JP | 2011-259585 A | 12/2011 |
| JP | 2012-034468 A | 2/2012 |
| JP | 2012-034494 A | 2/2012 |
| JP | 2012-125112 A | 6/2012 |
| JP | 2012-135109 A | 7/2012 |
| JP | 2012-165633 A | 8/2012 |
| KR | 2008-0031398 A | 4/2008 |
| KR | 10-2010-0015954 A | 2/2010 |
| WO | 2007/008646 A2 | 1/2007 |
| WO | 2008/118178 A1 | 10/2008 |
| WO | 2011/093292 A1 | 8/2011 |
| WO | 2011/132272 A1 | 10/2011 |
| WO | 2012/014485 A2 | 2/2012 |
| WO | 2012/111085 A1 | 8/2012 |
| WO | 2013/061440 A1 | 5/2013 |

\* cited by examiner

FIG. 13

| VEHICLE HEIGHT \ POSITIONAL DEVIATION | ≤ G1 | ≤ G2 | G2 > |
|---|---|---|---|
| ≤ H1 | (L11, C11) | (L21, C21) | (L31, C31) |
| ≤ H2 | (L12, C12) | (L22, C22) | (L32, C32) |
| H3 > | (L13, C13) | (L23, C23) | (L33, C33) |

SMALL ⟷ LARGE

HIGH ↕ LOW

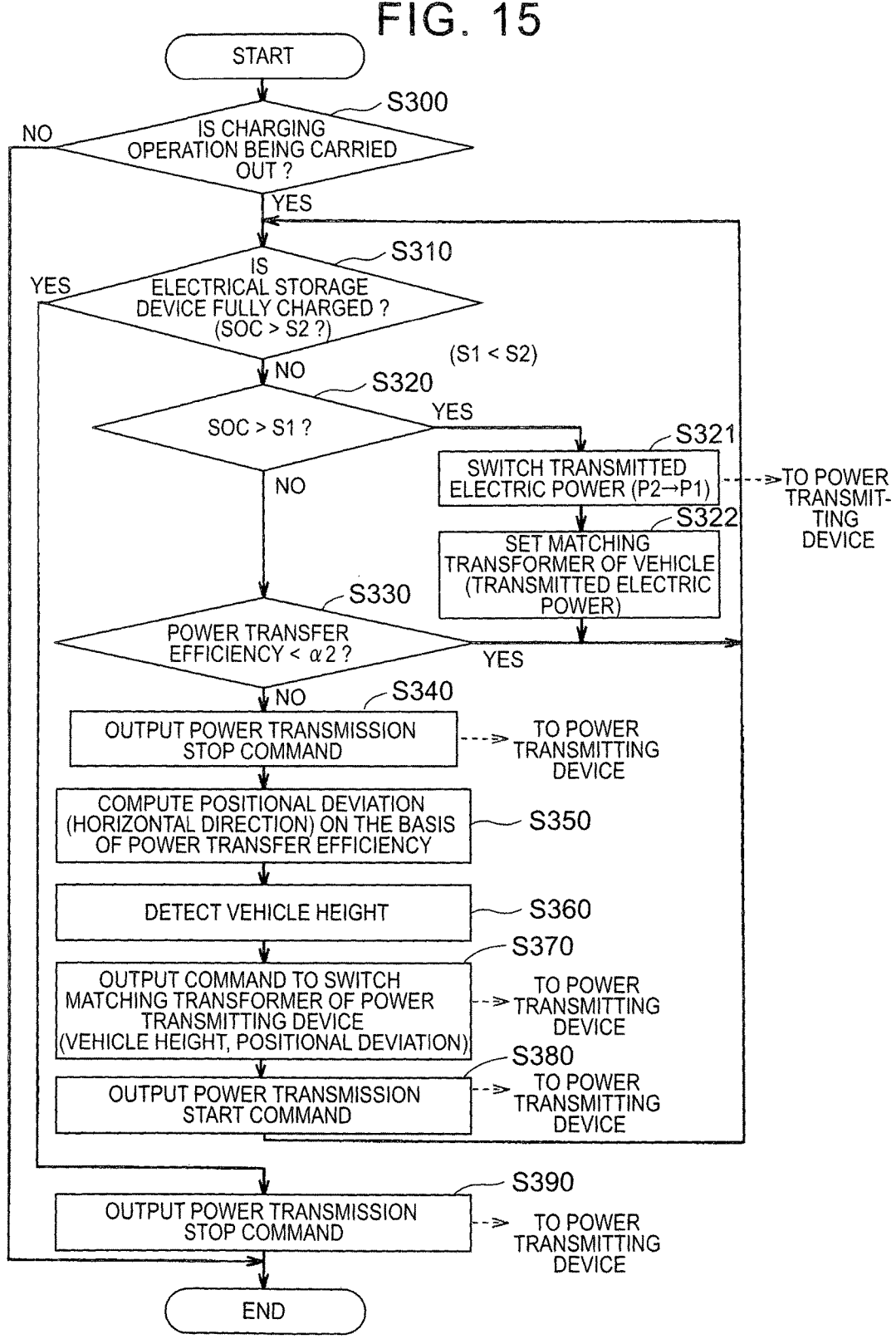

VEHICLE AND CONTACTLESS POWER SUPPLY SYSTEM FOR ADJUSTING IMPEDENCE BASED ON POWER TRANSFER EFFICIENCY

BACKGROUND OF THE INVENTION

1. Field of the Invention

The invention relates to a vehicle and a contactless power supply system and, more particularly, to a technique for improving power transfer efficiency in a contactless power supply system.

2. Description of Related Art

In recent years, contactless wireless power transfer that does not use a power cord or a power transmission cable has become a focus of attention, and it has been suggested that the contactless wireless power transfer is applied to an electric vehicle, a hybrid vehicle, or the like, of which an in-vehicle electrical storage device is chargeable by a power supply outside the vehicle, (hereinafter, also referred to as "external power supply").

In such a contactless power supply system, in order to improve power transfer efficiency, it is important to match impedance between a power transmitting side and a power receiving side.

Japanese Patent Application Publication No. 2012-034494 (JP 2012-034494 A) describes a configuration that an impedance matching unit provided between a power generating unit and an electric power supply point in a power supply device and an impedance matching unit provided between a power receiving element and a load in a power receiving device are provided in a system that is able to contactlessly supply electric power.

In a contactless power supply system that contactlessly transmits electric power from a power transmitting device to a vehicle, power transfer efficiency can vary depending on a distance between a power transmitting unit in the power transmitting device and a power receiving unit in the vehicle. This variation in distance includes a vehicle height that is a vertical distance between the power transmitting unit and the power receiving unit and a positional deviation that is a horizontal distance between the power transmitting unit and the power receiving unit.

For example, if an occupant gets on to the vehicle or gets off from the vehicle or a baggage is loaded into a trunk room or unloaded from the trunk room while power transmitting operation is being carried out from the power transmitting device to the power receiving device (vehicle), the vehicle height varies accordingly, so the input impedance of the power transmitting unit may fluctuate and the power transfer efficiency may decrease.

SUMMARY OF THE INVENTION

The invention provides a contactless power supply system that is able to prevent a decrease in power transfer efficiency and a vehicle that constitutes the contactless power supply system together with a power transmitting device.

An aspect of the invention provides a vehicle that contactlessly receives electric power from a power transmitting device of which an impedance is adjustable by a first impedance adjustment unit. The vehicle includes a power receiving unit, an electrical storage device and a control unit. The power receiving unit is configured to contactlessly receive electric power from the power transmitting device. The electrical storage device is configured to store electric power received by the power receiving unit. The control unit is configured to control charging operation of the electrical storage device, and is configured to output, to the power transmitting device, a command to adjust the first impedance adjustment unit and set an impedance of the first impedance adjustment unit on the basis of a power transfer efficiency between the power transmitting device and the power receiving unit while the electrical storage device is being charged.

The vehicle may further include a detecting unit configured to detect a vertical distance between the power receiving unit and a ground surface. The control unit may be configured to set the impedance of the first impedance adjustment unit on the basis of the distance detected by the detecting unit.

The control unit may be configured to compute a horizontal positional deviation between the power receiving unit and the power transmitting device on the basis of the power transfer efficiency while the electrical storage device is being charged, and set the impedance of the first impedance adjustment unit on the basis of the computed positional deviation.

The vehicle may further include a second impedance adjustment unit configured, to adjust an impedance between the power receiving unit and the electrical storage device. The power transmitting device may be configured to use a first electric power or a second electric power lower than the first electric power as a transmitted electric power for charging the electrical storage device. The control unit may be configured to cause the power transmitting device to output the first electric power when a value indicating a state of charge of the electrical storage device is lower than or equal to a predetermined threshold and cause the power transmitting device to output the second electric power when the value indicating the state of charge is higher than the threshold. The control unit may be configured to set an impedance of the second impedance adjustment unit on the basis of the transmitted electric power from the power transmitting device.

The vehicle may further include a detecting unit configured to detect a vertical distance between the power receiving unit and a ground surface. The control unit may be configured to cause the power transmitting device to transmit an electric power, lower than a transmitted electric power at the time when the electrical storage device is charged, in advance of charging of the electrical storage device, and set the impedance of the first impedance adjustment unit at the time of starting charging of the electrical storage device on the basis of the power transfer efficiency when the lower electric power is used and the distance.

The vehicle may further include a detecting unit configured to detect a vertical distance between the power receiving unit and a ground surface. The control unit may be configured to assist alignment of the power receiving unit with the power transmitting device on the basis of the power transfer efficiency between the power transmitting device and the power receiving unit while causing the power transmitting device to transmit an electric power lower than a transmitted electric power at the time when the electrical storage device is charged. The control unit may be configured to set the impedance of the first impedance adjustment unit at the time of causing the power transmitting device to transmit the lower electric power on the basis of the distance.

The power transmitting device may include a power transmitting unit configured to contactlessly supply electric power. A difference between a natural frequency of the power transmitting unit and a natural frequency of the power receiving unit may be smaller than or equal to ±10% of one of the natural frequency of the power transmitting unit and the natural frequency of the power receiving unit.

The power transmitting device may include a power transmitting unit configured to contactlessly supply electric power. A coupling coefficient between the power transmitting unit and the power receiving unit may be smaller than or equal to 0.1.

The power transmitting device may include a power transmitting unit configured to contactlessly supply electric power. The power receiving unit may be configured to receive electric power from the power transmitting unit through at least one of a magnetic field and an electric field. The magnetic field is between the power receiving unit and the power transmitting unit, and the magnetic field oscillates at a predetermined frequency. The electric field is between the power receiving unit and the power transmitting unit, and the electric field oscillates at a predetermined frequency.

Another aspect of the invention provides a contactless power supply system that contactlessly supplies electric power between a power transmitting device and a vehicle. The power transmitting device includes a power supply unit, a power transmitting unit and an impedance adjustment unit. The power transmitting unit is configured to contactlessly supply electric power, the electric power being supplied from the power supply unit to a power receiving unit. The impedance adjustment unit is electrically connected between the power supply unit and the power transmitting unit and is configured to adjust an impedance between the power supply unit and the power transmitting unit. The vehicle includes the power receiving unit, an electrical storage device and a control unit. The power receiving unit is configured to contactlessly receive electric power from the power transmitting device. The electrical storage device is configured to store electric power received by the power receiving unit. The control unit is configured to control charging operation of the electrical storage device. The control unit is configured to output, to the power transmitting device, a command to, adjust the impedance adjustment unit and the control unit is configured to set an impedance of the impedance adjustment unit on the basis of a power transfer efficiency between the power transmitting unit and the power receiving unit while the electrical storage device is being charged.

According to the invention, it is possible to prevent a decrease in power transfer efficiency in the contactless power supply system formed of the vehicle, including the power receiving unit, and the power transmitting device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 13 is a table that shows an example of a map for setting the impedance of the matching transformer at the power transmitting device in the embodiment;

FIG. 15 is a flowchart for illustrating impedance adjustment control that is executed by the vehicle ECU while the electrical storage device is being charged in the embodiment.

DETAILED DESCRIPTION OF EMBODIMENTS

Figure 1:
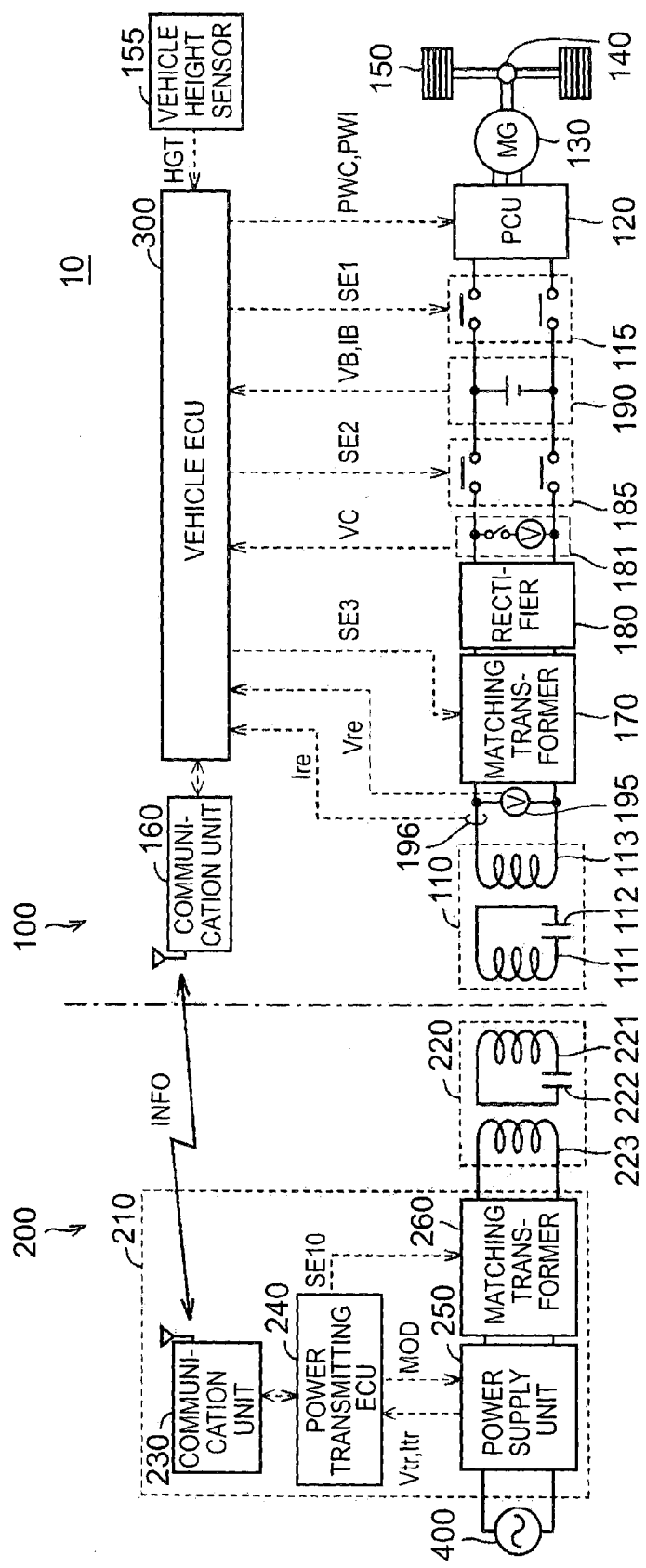
FIG. 1 is an overall configuration view of a vehicle power supply system (i.e., contactless power supply system) according to an embodiment of the invention.

Hereinafter, an embodiment of the invention will be described in detail with reference to the accompanying drawings. Like reference numerals denote the same or corresponding components in the drawings, and the description thereof is not repeated.

The configuration of a contactless power supply system according to the present embodiment will be described. FIG. 1 is an overall configuration view of a vehicle power supply system (i.e., contactless power supply system) 10 according to the present embodiment. The vehicle power supply system 10 includes a vehicle 100 and a power transmitting device 200. As shown in FIG. 1, the power transmitting device 200 includes a power supply device 210 and a power transmitting unit 220. The power supply device 210 generates alternating-current power having a predetermined frequency. For example, the power supply device 210 generates high-frequency alternating-current power upon reception of electric power from a commercial power supply 400, and supplies the generated alternating-current power to the power transmitting unit 220. Then, the power transmitting unit 220 contactlessly outputs electric power to a power receiving unit 110 of the vehicle 100 (described later) via an electromagnetic field that is generated around the power transmitting unit 220.

The power supply device 210 further includes a communication unit 230, a power transmitting ECU 240, a power supply unit 250 and a matching transformer 260. The power transmitting ECU 240 serves as a control unit. The power transmitting unit 220 includes a resonance coil 221, a capacitor 222 and an electromagnetic induction coil 223.

The power supply unit 250 is controlled by a control signal MOD from the power transmitting ECU 240, and converts electric power, received from an alternating-current power supply, such as the commercial power supply 400, to high-frequency electric power. Then, the power supply unit 250 supplies the converted high-frequency electric power to the electromagnetic induction coil 223 via the matching transformer 260.

The power supply unit 250 outputs a power transmission voltage Vtr that is detected by a voltage sensor (not shown) and a power transmission current Itr that is detected by a current sensor (not shown) to the power transmitting ECU 240.

Figure 2:
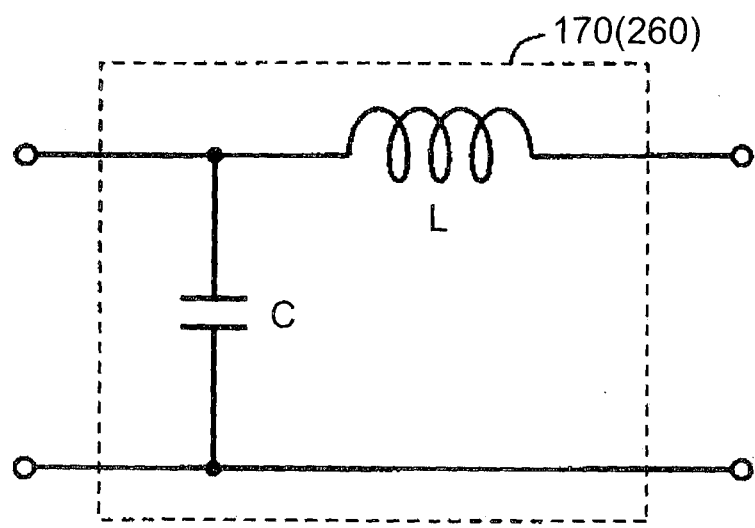
FIG. 2 is a view that shows an example of the configuration of each matching transformer in FIG. 1.

The matching transformer 260 is used to adjust the input impedance of the power transmitting unit 220, and is typically configured to include a reactor L and a capacitor C as shown in FIG. 2. The configuration of the matching transformer 260 is not limited to that shown in FIG. 2 as long as the impedance is adjustable.

In the present embodiment, the matching transformer 260 includes a plurality of circuits as shown in FIG. 2, respectively having different combinations of a reactor and a capacitor, and is configured to switch among those circuits.

The electromagnetic induction coil 223 is able to be magnetically coupled to the resonance coil 221 through electromagnetic induction. The electromagnetic induction coil 223 transmits high-frequency electric power, which is supplied from the power supply unit 250, to the resonance coil 221 through electromagnetic induction.

The resonance coil 221 contactlessly transfers electric power, which is transmitted from the electromagnetic induction coil 223, to a resonance coil 111 that is included in the power receiving unit 110 of the vehicle 100. Power transfer between the power receiving unit 110 and the power transmitting unit 220 will be described later with reference to FIG. 4.

The communication unit 230 is a communication interface for carrying out wireless communication between the power transmitting device 200 and the vehicle 100. The communication unit 230 exchanges information INFO with the communication unit. 160. The communication unit 230 receives vehicle information and a signal, or the like, for instructions to start or stop transmission of electric power, which are transmitted from the communication unit 160 of the vehicle 100, and outputs the received pieces of information to the power transmitting ECU 240. The communication unit 230 transmits information about the power transmission voltage Vtr, the power transmission current Itr, and the like, input from the power transmitting ECU 240, to the vehicle 100.

The power transmitting ECU 240 includes a central processing unit (CPU), a storage device and an input/output buffer (which are not shown in FIG. 1). The power transmitting ECU 240 receives signals from sensors, or the like, and outputs control signals to various devices to thereby control various devices in the power supply device 210. Control over the vehicle 100 and the devices is not only limited to processing by software but may also be processed by exclusive hardware (electronic circuit).

The vehicle 100 includes the power receiving unit 110, a matching transformer 170, a rectifier 180, a voltage detecting unit 181, a charging relay (CHR) 185, an electrical storage device 190, a system main relay (SMR) 115, a power control unit (PCU) 120, a motor generator 130, a power transmission gear 140, drive wheels 150, a vehicle electronic control unit (ECU) 300 that serves as the control unit, the communication unit 160, a voltage sensor 195 and a current sensor 196. The power receiving unit 110 includes the resonance coil 111, a capacitor 112 and an electromagnetic induction coil 113.

In the present embodiment, an electric vehicle is, for example, described as the vehicle 100; however, the configuration of the vehicle 100 is not limited to the electric vehicle as long as the vehicle is able to travel using electric power stored in the electrical storage device. Another example of the vehicle 100 includes a hybrid vehicle equipped with an engine, a fuel cell vehicle equipped with a fuel cell, and the like.

The resonance coil 111 contactlessly receives electric power from the resonance coil 221 included in the power transmitting device 200. The electromagnetic induction coil 113 is able to be magnetically coupled to the resonance coil 111 through electromagnetic induction. The electromagnetic induction coil 113 extracts electric power, received by the resonance coil 111, through electromagnetic induction, and outputs the extracted electric power to the rectifier 180 via the matching transformer 170.

The matching transformer 170 is used to adjust the input impedance of a load to which electric power received by the resonance coil 111 is supplied, and, for example, has the configuration as shown in FIG. 2 as in the case of the power transmitting-side matching transformer 260.

The rectifier 180 rectifies alternating-current power received from the electromagnetic induction coil 113 via the matching transformer 170, and outputs the rectified direct-current power to the electrical storage device 190. The rectifier 180 may be, for example, formed to include a diode bridge and a smoothing capacitor (both are not shown). The rectifier 180 may be a so-called switching regulator that rectifies alternating current using switching control. When the rectifier 180 is included in the power receiving unit 110, in order to prevent erroneous operation, or the like, of switching elements as a result of a generated electromagnetic field, the rectifier 180 is desirably a static rectifier, such as a diode bridge.

The voltage detecting unit 181 is, for example, configured to include a serially connected switch and voltage sensor, and detects a voltage VC between power lines that connect the rectifier 180 to the electrical storage device 190.

The charging relay (CHR) 185 is electrically connected to the rectifier 180 and the electrical storage device 190. The charging relay (CHR) 185 is controlled by a control signal SE2 from the vehicle ECU 300, and switches between supply and interruption of electric power from the rectifier 180 to the electrical storage device 190.

The electrical storage device 190 is an electric power storage element that is configured to be chargeable and dischargeable. The electrical storage device 190 is, for example, formed of a secondary battery, such as a lithium ion battery, a nickel-metal hydride battery and a lead-acid battery, or an electrical storage element, such as an electric double layer capacitor.

The electrical storage device 190 is connected to the rectifier 180 via the charging relay (CHR) 185. The electrical storage device 190 stores electric power received by the power receiving unit 110 and rectified by the rectifier 180. In addition, the electrical storage device 190 is also connected to the PCU 120 via the system main relay (SMR) 115. The electrical storage device 190 supplies electric power for generating vehicle driving force to the PCU 120. Furthermore, the electrical storage device 190 stores electric power generated by the motor generator 130. The output of the electrical storage device 190 is, for example, about 200 V.

A voltage sensor and a current sensor (both are not shown) are provided for the electrical storage device 190. The voltage sensor is used to detect the voltage VB of the electrical storage device 190. The current sensor is used to detect a current IB input to or output from the electrical storage device 190. These detected values are output to the vehicle ECU 300. The vehicle ECU 300 computes the state of charge (also referred to as "SOC") of the electrical storage device 190 on the basis of the voltage VB and the current IB.

The system main relay (SMR) 115 is electrically connected between the electrical storage device 190 and the PCU 120. Then, the system main relay (SMR) 115 is controlled by a control signal SE1 from the vehicle ECU 300, and switches between supply and interruption of electric power exchanged between the electrical storage device 190 and the PCU 120.

The PCU 120 includes a converter and an inverter (both are not shown). The converter is controlled by a control signal PWC from the vehicle ECU 300, and converts voltage from the electrical storage device 190. The inverter is controlled by a control signal PWI from the vehicle ECU 300, and drives the motor generator 130 using electric power converted by the converter.

The motor generator 130 is an alternating-current rotating electrical machine, and is, for example, a permanent-magnet synchronous motor that includes a rotor in which a permanent magnet is embedded.

The output torque of the motor generator 130 is transmitted to the drive wheels 150 via the power transmission gear 140. The vehicle 100 travels using the transmitted torque. The motor generator 130 is able to generate electric power using the rotational force of the drive wheels 150 during regenerative braking operation of the vehicle 100. Then, the generated electric power is converted by the PCU 120 to charging electric power for charging the electrical storage device 190.

In addition, in a hybrid vehicle equipped with an engine (not shown) in addition to the motor generator 130, the engine and the motor generator 130 are cooperatively operated to generate required vehicle driving force. In this case, the electrical storage device 190 may be charged with electric power generated through the rotation of the engine.

The communication unit 160 is a communication interface for carrying out wireless communication between the vehicle 100 and the power transmitting device 200. The communication unit 160 exchanges information INFO with the communication unit 230 of the power transmitting device 200. The information INFO that is output from the communication unit 160 to the power transmitting device 200 includes vehicle information from the vehicle ECU 300, a signal for instructions to start or stop transmission of electric power, a command to switch the matching transformer 260 of the power transmitting device 200, and the like.

The vehicle ECU 300 includes a CPU, a storage unit and an input/output buffer, which are not shown in FIG. 1. The vehicle ECU 300 receives signals from the sensors, and the like, outputs control signals to the devices, and controls the devices in the vehicle 100. Control over the vehicle 100 and the devices is not only limited to processing by software but may also be processed by exclusive hardware (electronic circuit).

A vehicle height sensor 155 is, for example, provided on the lower face of a floor panel of the vehicle 100. The vehicle height sensor 155 detects a distance between the floor panel and a ground surface, that is, a distance between the power receiving unit 110 and a ground surface, and outputs a detected value HGT to the vehicle ECU 300.

The voltage sensor 195 is connected in parallel with the electromagnetic induction coil 113, and detects a power receiving voltage Vre received by the power receiving unit 110. The current sensor 196 is provided in a power line that connects the electromagnetic induction coil 113 to the matching transformer 170, and detects a power receiving current Ire. The detected value of the power receiving voltage Vre and the detected value of the power receiving current Ire are transmitted to the vehicle ECU 300, and are used to, for example, compute a power transfer efficiency.

The vehicle ECU 300 detects a horizontal positional deviation between the power receiving unit 110 and the power transmitting unit 220 on the basis of the voltage VC at the time when electric power is received from the power transmitting device 200.

Figure 3:
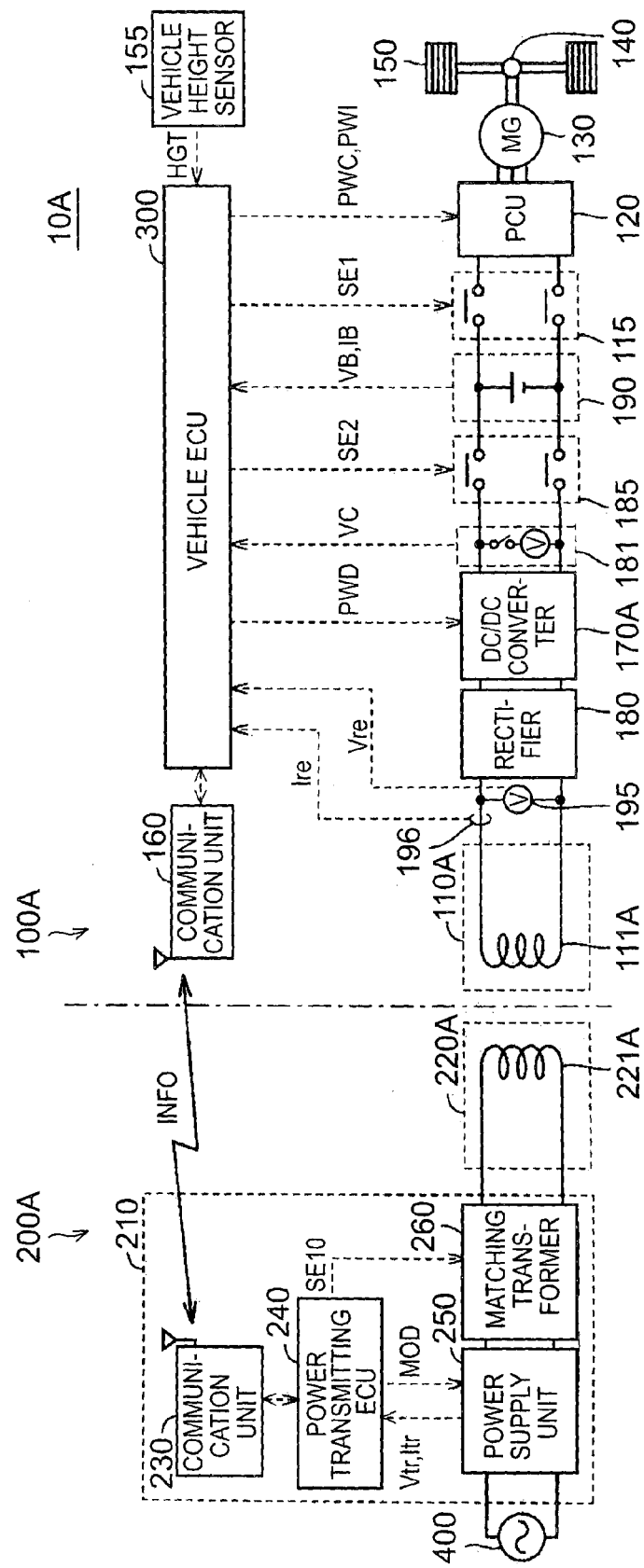
FIG. 3 is an overall configuration view of a vehicle power supply system according to an alternative embodiment to the embodiment of the invention.

In FIG. 1, the power receiving unit 110 and the power transmitting unit 220 respectively include the electromagnetic induction coils 113, 223; instead, as in the case of a power receiving unit 110A and a power transmitting unit 220A in a vehicle power supply system 10A shown in FIG. 3, an electromagnetic induction coil may not be provided. In this case, in the power transmitting unit 220A, a resonance coil 221A is connected to the power supply unit 250 via the matching transformer 260, and, in the power receiving unit 110, a resonance coil 111A is connected to the rectifier 180 via the matching transformer 170.

As impedance adjustment means in the vehicle, as shown in FIG. 3, a DC/DC converter 170A that converts direct-current voltage rectified by the rectifier 180 may be provided instead of the matching transformer 170 shown in FIG. 1.

Figure 4:
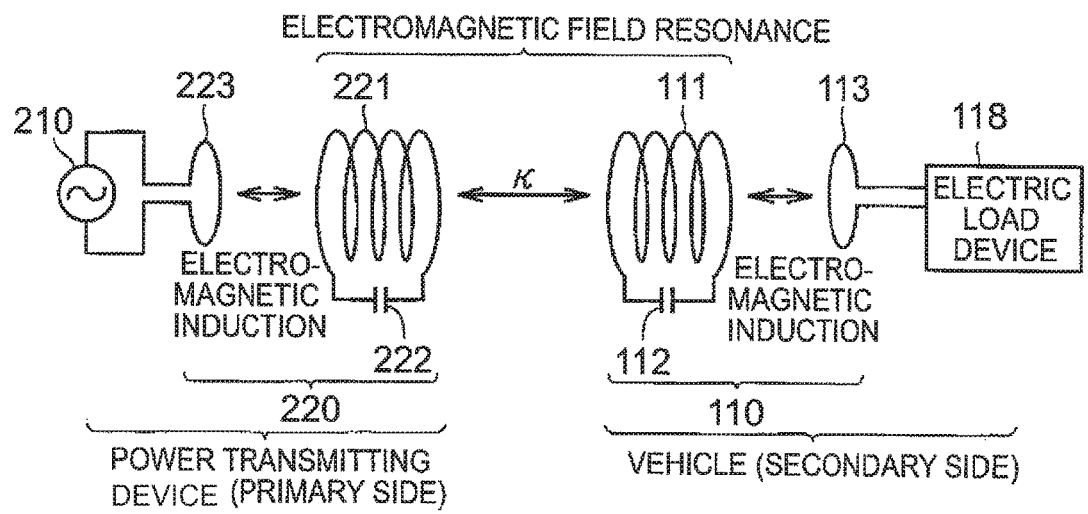
FIG. 4 is an equivalent circuit diagram at the time of power transfer from a power transmitting device to a vehicle in the vehicle power supply system according to the embodiment of the invention.

Next, the principle of power transfer will be described. FIG. 4 is an equivalent circuit diagram at the time of power transfer from the power transmitting device 200 to the vehicle 100. As shown in FIG. 4, the power transmitting unit 220 of the power transmitting device 200 includes the resonance coil 221, the capacitor 222 and the electromagnetic induction coil 223.

The electromagnetic induction coil 223 is, for example, provided substantially coaxially with the resonance coil 221 at a predetermined gap from the resonance coil 221. The electromagnetic induction coil 223 is magnetically coupled to the resonance coil 221 through electromagnetic induction, and supplies high-frequency electric power, which is supplied from the power supply device 210, to, the resonance coil 221 through electromagnetic induction.

The resonance coil 221 forms an LC resonant circuit together with the capacitor 222. As will be described later, an LC resonant circuit is also formed in the power receiving unit 110 of the vehicle 100. The difference between the natural frequency of the LC resonant circuit formed of the resonance coil 221 and the capacitor 222 and the natural frequency of the LC resonant circuit of the power receiving unit 110 is smaller than or equal to ±10% of one of the natural frequency of the former LC resonant circuit and the natural frequency of the latter LC resonant circuit. Then, the resonance coil 221 receives electric power from the electromagnetic induction coil 223 through electromagnetic induction, and contactlessly transmits electric power to the power receiving unit 110 of the vehicle 100.

The electromagnetic induction coil 223 is provided in order to easily supply electric power from the power supply device 210 to the resonance coil 221. The power supply device 210 may be directly connected to the resonance coil 221 without providing the electromagnetic induction coil 223. In addition, the capacitor 222 is provided in order to adjust the natural frequency of the resonant circuit. When a desired natural frequency is obtained by utilizing the stray capacitance of the resonance coil 221, it is not necessary to provide the capacitor 222.

The power receiving unit 110 of the vehicle 100 includes the resonance coil 111, the capacitor 112 and the electromagnetic induction coil 113. The resonance coil 111 forms an LC resonant circuit together with the capacitor 112. As described above, the difference between the natural frequency of the LC resonant circuit formed of the resonance coil 111 and the capacitor 112 and the natural frequency of the LC resonant circuit formed of the resonance coil 221 and the capacitor 222 in the power transmitting unit 220 of the power transmitting device 200 is smaller than or equal to ±10% of one of the natural frequency of the former LC resonant circuit and the natural frequency of the latter LC resonant circuit. The resonance coil 111 contactlessly receives electric power from the power transmitting unit 220 of the power transmitting device 200.

The electromagnetic induction coil 113 is, for example, provided substantially coaxially with the resonance coil 111 at a predetermined gap from the resonance coil 111. The electromagnetic induction coil 113 is magnetically coupled to the resonance coil 111 through electromagnetic induction, extracts electric power, received by the resonance coil 111, through electromagnetic induction, and outputs the extracted electric power to an electric load device 118. The electric load device 118 is an electrical device that utilizes electric power received by the power receiving unit 110, and specifically collectively indicates electrical devices downstream of the rectifier 180 (FIG. 1).

The electromagnetic induction coil 113 is provided in order to easily extract electric power from the resonance coil 111. The rectifier 180 may be directly connected to the resonance coil 111 without providing the electromagnetic induction coil 113. In addition, the capacitor 112 is provided in order to adjust the natural frequency of the resonant circuit. When a desired natural frequency is obtained by utilizing the stray capacitance of the resonance coil 111, it is not necessary to provide the capacitor 112.

In the power transmitting device 200, high-frequency alternating-current power is supplied from the power supply device 210 to the electromagnetic induction coil 223, and electric power is supplied from the electromagnetic induction coil 223 to the resonance coil 221. Thus, energy (electric power) is transferred from the resonance coil 221 to the resonance coil 111 through a magnetic field formed between the resonance coil 221 and the resonance coil 111 of the vehicle 100. Energy (electric power) transferred to the resonance coil 111 is extracted with the use of the electromagnetic induction coil 113, and is transferred to the electric load device 118 of the vehicle 100.

As described above, in the power transfer system, the difference between the natural frequency of the power transmitting unit 220 of the power transmitting device 200 and the natural frequency of the power receiving unit 110 of the vehicle 100 is smaller than or equal to ±10% of one of the natural frequency of the power transmitting unit 220 and the natural frequency of the power receiving unit 110. By setting the natural frequency of each of the power transmitting unit 220 and the power receiving unit 110 within the above range, it is possible to increase the power transfer efficiency. On the other hand, when the above-described difference in natural frequency is larger than ±10%, the power transfer efficiency becomes lower than 10%, so there may occur an inconvenience, such as an increase in power transfer time.

The natural frequency of the power transmitting unit 220 (power receiving unit 110) means an oscillation frequency in the case where the electric circuit (resonant circuit) that constitutes the power transmitting unit 220 (power receiving unit 110) freely oscillates. In the electric circuit (resonant circuit) that constitutes the power transmitting unit 220 (power receiving unit 110), the natural frequency at the time when braking force or electrical resistance is substantially zero is also called the resonance frequency of the power transmitting unit 220 (power receiving unit 110).

Figure 5:
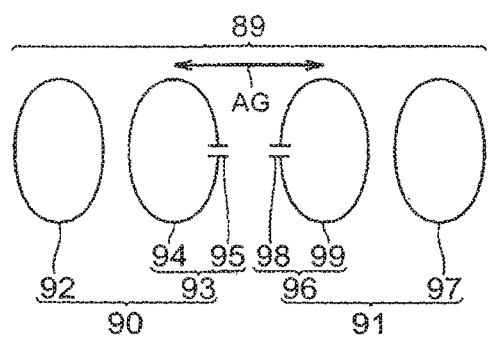
FIG. 5 is a view that shows a simulation model of a power transfer system.
Figure 6:
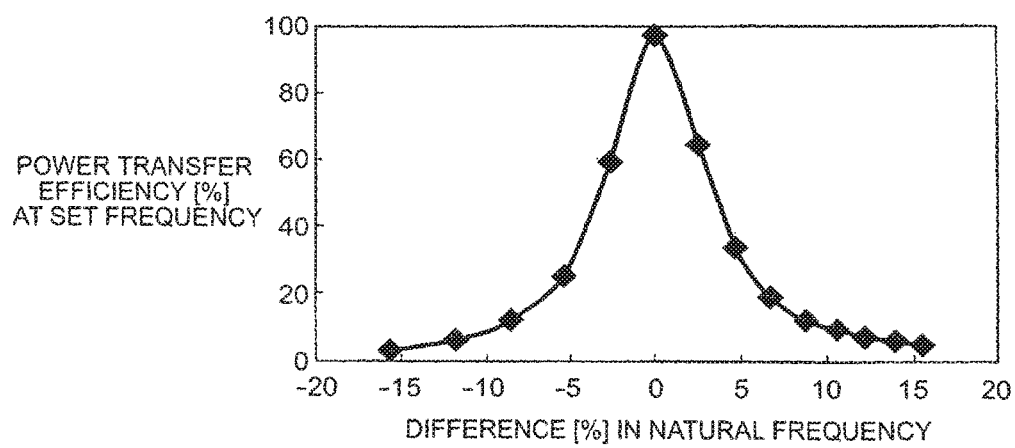
FIG. 6 is a graph that shows the correlation between a difference in natural frequency of each of a power transmitting unit and a power receiving unit in the vehicle power supply system and a power transfer efficiency.

The simulation result obtained by analyzing the correlation between a difference in natural frequency and a power transfer efficiency will be described with reference to FIG. 5 and FIG. 6. FIG. 5 is a view that shows a simulation model of a power transfer system. In addition, FIG. 6 is a graph that shows the correlation between a difference in the natural frequency of each of the power transmitting unit and the power receiving unit and a power transfer efficiency.

As shown in FIG. 5, the power transfer system 89 includes a power transmitting unit 90 and a power receiving unit 91. The power transmitting unit 90 includes a first coil 92 and a second coil 93. The second coil 93 includes a resonance coil 94 and a capacitor 95 provided in the resonance coil 94. The power receiving unit 91 includes a third coil 96 and a fourth coil 97. The third coil 96 includes a resonance coil 99 and a capacitor 98 connected to the resonance coil 99.

The inductance of the resonance coil 94 is set to Lt, and the capacitance of the capacitor 95 is set to C1. In addition, the inductance of the resonance coil 99 is set to Lr, and the capacitance of the capacitor 98 is set to C2. When the parameters are set in this way, the natural frequency f1 of the second coil 93 is expressed by the following mathematical expression (1), and the natural frequency f2 of the third coil 96 is expressed by the following mathematical expression (2).

$$f1 = 1/\{2\pi(Lt \times C1)^{1/2}\} \tag{1}$$

$$f2 = 1/\{2\pi(Lr \times C2)^{1/2}\} \tag{2}$$

Here, in the case where the inductance Lr and the capacitances C1, C2 are fixed and only the inductance Lt is varied, the correlation between a difference in natural frequency between the second coil 93 and the third coil 96 and a power transfer efficiency is shown in FIG. 6. In this simulation, a relative positional relationship between the resonance coil 94 and the resonance coil 99 is fixed, and, furthermore, the frequency of current that is supplied to the second coil 93 is constant.

As shown in FIG. 6, the abscissa axis represents a difference Df (%) in natural frequency, and the ordinate axis represents a power transfer efficiency (%) at a current having a set frequency. The difference Df (%) in natural frequency is expressed by the following mathematical expression (3).

$$\text{(Difference in Natural Frequency)} = \{(f1-f2)/f2\} \times 100 \text{ (\%)} \tag{3}$$

As is apparent from FIG. 6, when the difference (%) in natural frequency is 0%, the power transfer efficiency is close to 100%. When the difference (%) in natural frequency is ±5%, the power transfer efficiency is about 40%. When the difference (%) in natural frequency is ±10%, the power transfer efficiency is about 10%. When the difference (%) in natural frequency is ±15%, the power transfer efficiency is about 5%. That is, it is found that, by setting the natural frequency of each of the second coil 93 and the third coil 96 such that the absolute value of the difference (%) in natural frequency (difference in natural frequency) falls at or below 10% of the natural frequency of the third coil 96, it is possible to increase the power transfer efficiency to a practical level. Furthermore, by setting the natural frequency of each of the second coil 93 and the third coil 96 such that the absolute value of the difference (%) in natural frequency is smaller than or equal to 5% of the natural frequency of the third coil 96, it is possible to further increase the power transfer efficiency, so it is more desirable. The electromagnetic field analyzation software application (JMAG (trademark): produced by JSOL Corporation) is employed as a simulation software application.

Referring back to FIG. 4, the power transmitting unit 220 of the power transmitting device 200 and the power receiving unit 110 of the vehicle 100 contactlessly exchange electric power through at least one of a magnetic field and an electric field. The magnetic field is formed between the power transmitting unit 220 and the power receiving unit 110, and oscillates at a predetermined frequency. The electric field is formed between the power transmitting unit 220 and the power receiving unit 110, and oscillates at a predetermined frequency. A coupling coefficient κ between the power transmitting unit 220 and the power receiving unit 110 is desirably smaller than or equal to 0.1. By resonating the power transmitting unit 220 and the power receiving unit 110 through the electromagnetic field, electric power is transferred from the power transmitting unit 220 to the power receiving unit 110.

Here, the magnetic field having the predetermined frequency, which is formed around the power transmitting unit 220, will be described. The "magnetic field having the predetermined frequency" typically correlates with the power transfer efficiency and the frequency of current that is supplied to the power transmitting unit 220. Then, first, the correlation between the power transfer efficiency and the frequency of current that is supplied to the power transmitting unit 220 will be described. The power transfer efficiency at the time when electric power is transferred from the power transmitting unit 220 to the power receiving unit 110 varies depending on various factors, such as a distance between the power transmitting unit 220 and the power receiving unit 110. For example, the natural frequency (resonance frequency) of each of the power transmitting unit 220 and the power receiving unit 110 is set to f0, the frequency of current that is supplied to the power transmitting unit 220 is set to f3, and the air gap between the power transmitting unit 220 and the power receiving unit 110 is set to AG.

Figure 7:
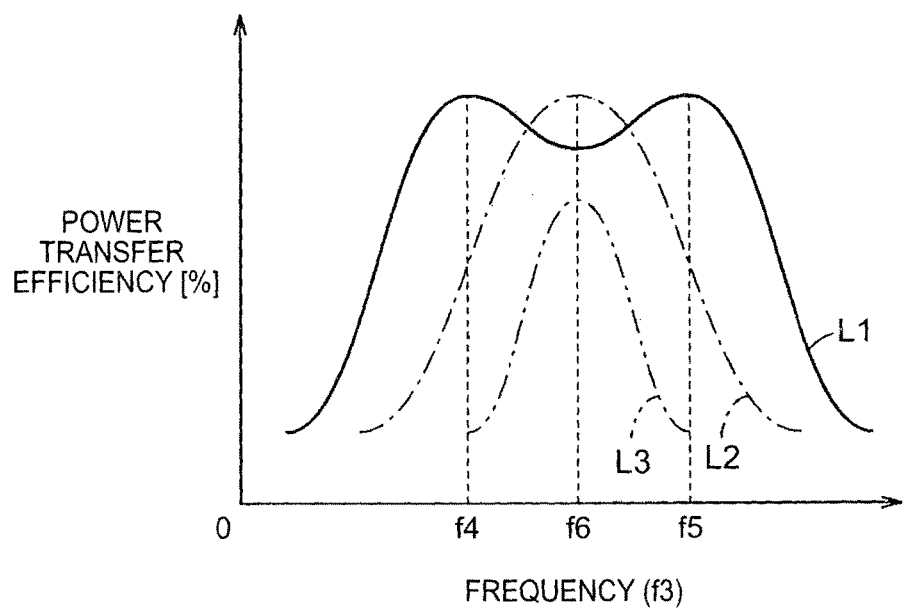
FIG. 7 is a graph that shows the correlation between a power transfer efficiency at the time when an air gap is varied and the frequency of a current that is supplied to the power transmitting unit in a state where the natural frequency is fixed in the vehicle power supply system.

FIG. 7 is a graph that shows the correlation between a power transfer efficiency and the frequency f3 of current that is supplied to the power transmitting unit 220 at the time when the air gap AG is varied in a state where the natural frequency f0 is fixed. In FIG. 7, the abscissa axis represents the frequency f3 of current that is supplied to the power transmitting unit 220, and the ordinate axis represents a power transfer efficiency (%). An efficiency curve L1 schematically shows the correlation between a power transfer efficiency and the frequency f3 of current that is supplied to the power transmitting unit 220 when the air gap AG is small. As indicated by the efficiency curve L1, when the air gap AG is small, the peak of the power transfer efficiency appears at the frequencies f4, f5 (f4<f5) of current. When the air gap AG is increased, two peaks at which the power transfer efficiency is high vary so as to approach each other. Then, as indicated by an efficiency curve L2, when the air gap AG is increased to be longer than a predetermined distance, the number of the peaks of the power transfer efficiency is one, the power transfer efficiency becomes a peak when the frequency of current that is supplied to the power transmitting unit 220 is f6. When the air gap AG is further increased from the state of the efficiency curve L2, the peak of the power transfer efficiency reduces as indicated by an efficiency curve L3.

For example, the following methods are conceivable as a method of improving the power transfer efficiency. In a first method, by varying the capacitances of the capacitor 222 and capacitor 112 in accordance with the air gap AG while the frequency of current that is supplied to the power transmitting unit 220 is constant, the characteristic of power transfer efficiency between the power transmitting unit 220 and the power receiving unit 110 is varied. Specifically, the capacitances of the capacitor 222 and capacitor 112 are adjusted such that the power transfer efficiency becomes a peak in a state where the frequency of current that is supplied to the power transmitting unit 220 is constant. In this method, irrespective of the size of the air gap AG, the frequency of current flowing through the power transmitting unit 220 and the power receiving unit 110 is constant.

In addition, in the second method, the frequency of current that is supplied to the power transmitting unit 220 is adjusted on the basis of the size of the air gap AG. For example, when the power transfer characteristic becomes the efficiency curve L1, current having the frequency f4 or the frequency f5 is supplied to the power transmitting unit 220. When the frequency characteristic becomes the efficiency curve L2 or the efficiency curve L3, current having the frequency f6 is supplied to the power transmitting unit 220. In this case, the frequency of current flowing through the power transmitting unit 220 and the power receiving unit 110 is varied in accordance with the size of the air gap AG.

In the first method, the frequency of current flowing through the power transmitting unit 220 is a fixed constant frequency, and, in the second method, the frequency of current flowing through the power transmitting unit 220 is a frequency that appropriately varies with the air gap AG Through the first method, the second method, or the like, current having the predetermined frequency set such that the power transfer efficiency is high is supplied to the power transmitting unit 220. When current having the predetermined frequency flows through the power transmitting unit 220, a magnetic field (electromagnetic field) that oscillates at the predetermined frequency is formed around the power transmitting unit 220. The power receiving unit 110 receives electric power from the power transmitting unit 220 through the magnetic field that is formed between the power receiving unit 110 and the power transmitting unit 220 and that oscillates at the predetermined frequency. Thus, the "magnetic field that oscillates at the predetermined frequency" is not necessarily a magnetic field having a fixed frequency. In the above-described embodiment, the frequency of current that is supplied to the power transmitting unit 220 is set by focusing on the air gap AG; however, the power transfer efficiency also varies on the basis of other factors, such as a horizontal deviation between the power transmitting unit 220 and the power receiving unit 110, so the frequency of current that is supplied to the power transmitting unit 220 may possibly be adjusted on the basis of those other factors.

The above description is made on the example in which a helical coil is employed as each resonance coil; however, when an antenna, such as a meander line antenna, is employed as each resonance coil, current having the predetermined frequency flows through the power transmitting unit 220, and, therefore, an electric field having the predetermined frequency is formed around the power transmitting unit 220. Then, through the electric field, electric power is transferred between the power transmitting unit 220 and the power receiving unit 110.

In the power transfer system, a near field (evanescent field) in which the static electromagnetic field of an electromagnetic field is dominant is utilized. Thus, power transmitting and power receiving efficiencies are improved.

Figure 8:
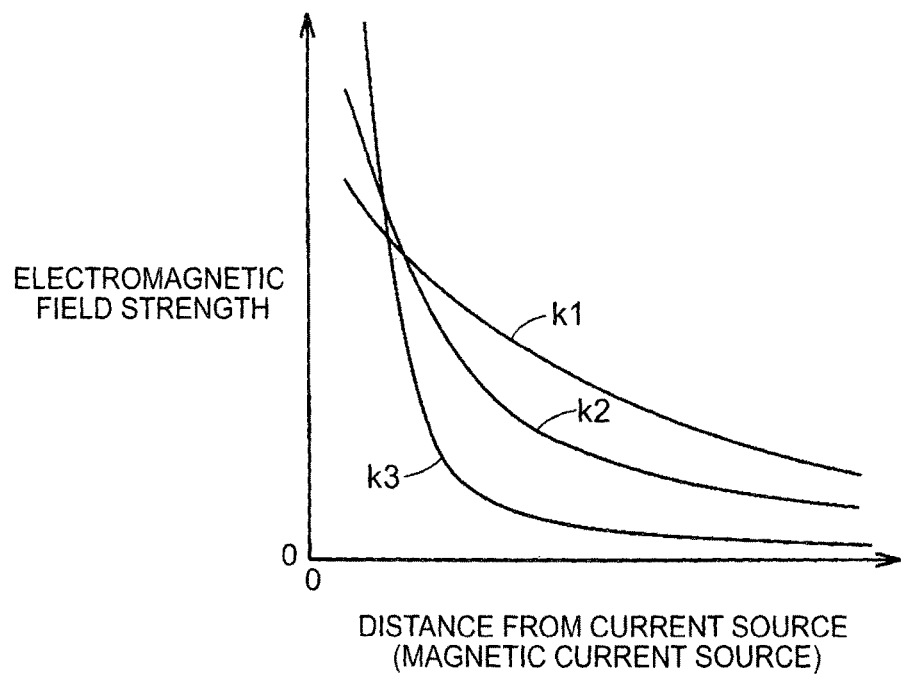
FIG. 8 is a graph that shows the correlation between a distance from a current source (magnetic current source) and the strength of an electromagnetic field in the vehicle power supply system.

FIG. 8 is a graph that shows the relationship between a distance from a current source (magnetic current source) and the strength of electromagnetic field. As shown in FIG. 8, the electromagnetic field consists of three components. The curve k1 is a component that is inversely proportional to the distance from a wave source, and is called radiation electromagnetic field. The curve k2 is a component that is, inversely proportional to the square of the distance from the wave source, and is called induction electromagnetic field. In addition, the curve k3 is a component inversely proportional to the cube of the distance from the wave source, and is referred to as static electromagnetic field. Where the wavelength of the electromagnetic field is $\lambda$, a distance at which the strengths of the radiation electromagnetic field, induction electromagnetic field and static electromagnetic field are substantially equal to one another may be expressed as $\lambda/2\pi$.

The static electromagnetic field is a region in which the strength of electromagnetic field steeply reduces with a distance from a wave source, and, in the power transfer system according to the present embodiment, a near field (evanescent field) in which the static electromagnetic field is dominant is utilized to transfer energy (electric power). That is, by resonating the power transmitting unit 220 and the power receiving unit 110 (for example, a pair of LC resonance coils) having the close natural frequencies in the near field in which the static electromagnetic field is dominant, energy (electric power) is transferred from the power transmitting unit 220 to the other power receiving unit 110. The static electromagnetic field does not propagate energy over a long distance, so the resonance method is able to transmit electric power with less loss of energy in comparison with an electromagnetic wave that transmits energy (electric power) through the radiation electromagnetic field that propagates energy over a long distance.

In this way, in the power transfer system, by resonating the power transmitting unit 220 and the power receiving unit 110 through the electromagnetic field, electric power is contactlessly transferred between the power transmitting unit 220 and the power receiving unit 110. Then, a coupling coefficient $\kappa$ between the power transmitting unit 220 and the power receiving unit 110 is, for example, smaller than or equal to about 0.3, and is desirably smaller than or equal to 0.1. Of course, the coupling coefficient $\kappa$ that ranges from about 0.1 to 0.3 may also be employed. The coupling coefficient $\kappa$ is not limited to this value; it may be various values at which power transfer is good.

Coupling between the power transmitting unit 220 and the power receiving unit 110 in power transfer is, for example, called magnetic resonance coupling, magnetic field resonance coupling, electromagnetic field resonance coupling or electric field resonance coupling. The electromagnetic field resonance coupling means coupling that includes the magnetic resonance coupling, the magnetic field resonance coupling and the electric field resonance coupling.

When the power transmitting unit 220 and the power receiving unit 110 are formed of coils as described above, the power transmitting unit 220 and the power receiving unit 110 are mainly coupled through a magnetic field, and magnetic resonance coupling or magnetic field resonance coupling is formed. For example, an antenna, such as a meander line antenna, may be employed as each of the power transmitting unit 220 and the power receiving unit 110. In this case, the power transmitting unit 220 and the power receiving unit 110 are mainly coupled through an electric field, and electric field resonance coupling is formed.

Next, impedance adjustment control will be described. In the above-described contactless power supply system, an impedance between the power transmitting unit of the power transmitting device and the power receiving unit of the power receiving device varies depending on the positional relationship between the power transmitting unit and the power receiving unit, and the power transfer efficiency can vary. Particularly, when the power receiving device is a vehicle as described above, it is difficult to park the vehicle at an ideal location in terms of design. When the vehicle-side power receiving unit is arranged at the bottom surface (floor panel) of the vehicle, a distance (hereinafter, also referred to as "vehicle height" in the specification) between the vehicle bottom surface and a ground surface can vary depending on an occupant seated in the vehicle, the amount of baggage loaded on the vehicle, or the like.

In addition, when the impedance of the load varies while the load is being supplied with electric power at the power receiving side, the impedance of the power receiving side with respect to the power transmitting side varies, and the power transfer efficiency may vary.

In order to compensate for such a variation in impedance between the power transmitting unit and the power receiving unit, there is known a method of suppressing a decrease in power transfer efficiency by providing an impedance adjustment mechanism, such as the matching transformer, at the power transmitting side and/or the power receiving side as shown in FIG. 1. Then, by appropriately utilizing the impedance adjustment mechanism, it is possible to suppress a decrease in power transfer efficiency.

Figure 9:
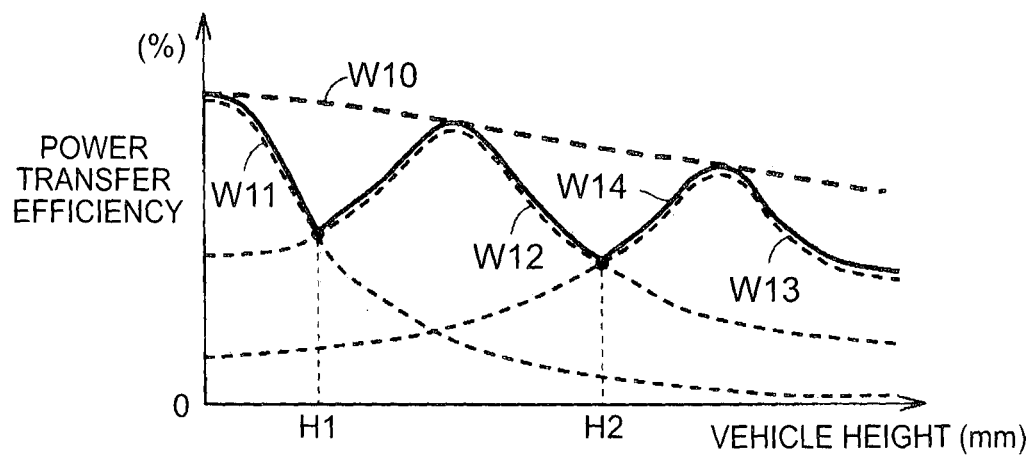
FIG. 9 is a graph for illustrating the correlation between a power transfer efficiency and a vehicle height in the vehicle power supply system.

In the present embodiment, particularly, impedance adjustment control based on fluctuations in vehicle height will be described. FIG. 9 is a graph for illustrating the correlation between a power transfer efficiency and a vehicle height. In FIG. 9, the abscissa axis represents vehicle height, and the ordinate axis represents power transfer efficiency.

As shown in FIG. 9, an electric power that is transferrable from the power transmitting unit to the power receiving unit generally depends on the distance between the power transmitting unit and the power receiving unit. Therefore, a maximum transfer efficiency W10 in the case where an impedance in the power supply system is optimally adjusted gradually decreases with an increase in vehicle height as indicated by the dashed line W10 in FIG. 9.

The maximum transfer efficiency can be achieved when the impedance is continuously adjustable by the matching transformer in a wide range. On the other hand, in the case of the matching transformer having a predetermined inductance and a predetermined capacitance as shown in FIG. 2, the maximum transfer efficiency can, be achieved at a specific vehicle height, for example, as indicated by the dashed lines W11 to W13 in FIG. 9, due to a combination of inductance and capacitance; however, the power transfer efficiency at another vehicle height is lower than the maximum transfer efficiency.

The matching transformer that is able to continuously adjust impedance in a wide range so as to be able to achieve the maximum transfer efficiency can be large in size and high in cost. Therefore, actually, a method of switching a plurality of matching transformers respectively having different pairs of specific inductance and specific capacitance or a plurality of variable matching transformers respectively having different adjustment ranges is employed.

That is, as shown in FIG. 9, for example, if three matching transformers respectively having characteristics indicated by the dashed lines W11 to W13 are used, the matching transformer having the highest power transfer efficiency for each vehicle height is selected. More specifically, the matching transformer having the characteristic indicated by the dashed line. W11 is selected when the vehicle height is smaller than H1, the matching transformer having the characteristic indicated by the dashed line W12 is selected when the vehicle height is between H1 and H2, and the matching transformer having the characteristic indicated by the dashed line W13 is selected when the vehicle height is larger than H2. With this configuration, the power transfer efficiency is indicated by the solid line W14 as a result.

Figure 10:
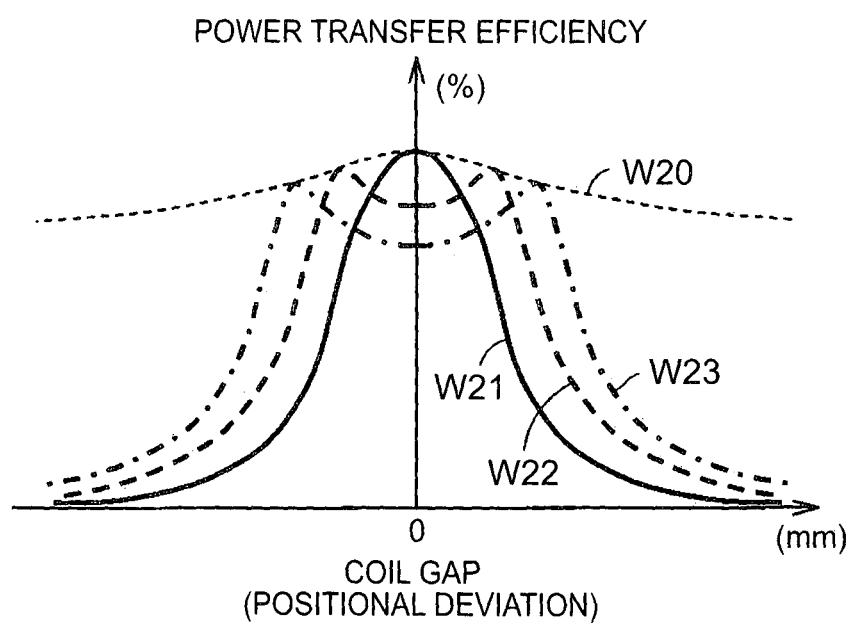
FIG. 10 is a graph for illustrating the correlation between a power transfer efficiency and a positional deviation in the vehicle power supply system.

FIG. 10 is a graph for illustrating the correlation between a power transfer efficiency and a horizontal coil gap (positional deviation) between the power transmitting unit and the power receiving unit. In FIG. 10, the abscissa axis represents a positional deviation between the power transmitting unit and the power receiving unit in a predetermined direction, such as the travel direction of the vehicle, and the ordinate axis represents a power transfer efficiency.

As shown in FIG. 10, an electric power that is transferable from the power transmitting unit to the power receiving unit depends on the distance between the power transmitting unit and the power receiving unit as described above, so, for the positional deviation as well, the maximum transfer efficiency decreases with an increase in positional deviation as indicated by the dashed line W20.

When the matching transformer is appropriately adjusted in a state where there is no positional deviation, a single-peak characteristic in which the power transfer efficiency is maximum when the positional deviation is zero is obtained as indicated by the solid line W21 in FIG. 10. In this case, as the positional deviation increases, the power transfer efficiency steeply decreases. On the other hand, when another matching transformer is used, there may be a case where a double-peak characteristic in which the power transfer efficiency is maximum at specific positional deviations (the dashed lines W22, W23 in FIG. 10).

Therefore, when a positional deviation has been detected, the matching transformer having a double-peak characteristic is employed from among the selectable matching transformers such that the power transfer efficiency is maximum at that positional deviation.

Figure 11:
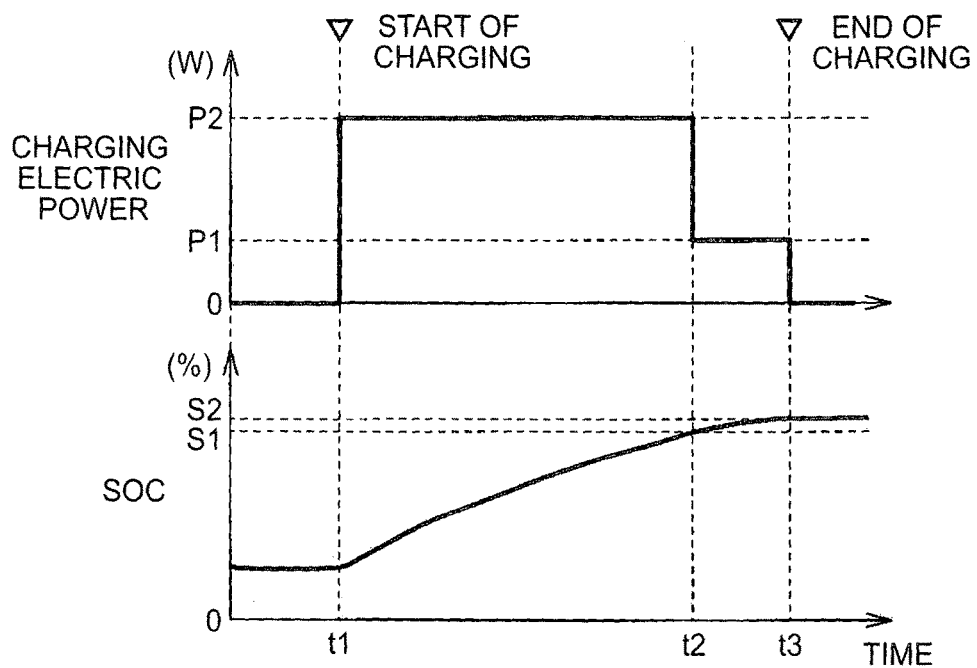
FIG. 11 is a graph for illustrating an example of the correlation between a state of charge of an electrical storage device and a charging electric power in the vehicle power supply system.

FIG. 11 shows an example of the correlation between a state of charge (SOC) of the electrical storage device and a charging electric power. In the example shown in FIG. 11, when charging is started at time t1, the electrical storage device is charged with a relatively large charging electric power P2 in a state where the SOC is low. When the SOC reaches S1 that is slightly lower than S2 that indicates a fully charged state (time t2 in FIG. 11), the charging electric power is decreased from P2 to P1 (P2>P1). Thus, during a period until the SOC changes from S1 to S2 (between time t2 and time t3 in FIG. 11), the SOC gently increases due to the low charging electric power.

As described above, the SOC of the electrical storage device is computed on the basis of detected values of the current sensor and voltage sensor that are provided at the electrical storage device. It is possible to reduce a charging time when the electrical storage device is charged with a larger charging electric power. However, when the electrical storage device is charged with a large charging electric power, a voltage that is applied to the electrical storage device increases due to the internal resistance of the electrical storage device, so it may lead to deterioration of the electrical storage device or damage to the electrical storage device. Thus, as shown in FIG. 11, in a state close to a fully charged state, by gently charging the electrical storage device with a decreased charging electric power, it is possible to suppress an overvoltage of the electrical storage device. In addition, it is possible to acquire an accurate SOC, so it is possible to accurately determine a fully charged state. The charging electric power may be adjusted by varying a voltage or by varying a current.

In contactless power transfer, as described above, a state where the impedance is matched between a power transmitting side and a power receiving side influences a power transfer efficiency. Therefore, when the load-side impedance varies with the progress of charging operation, the power transfer efficiency may gradually decrease accordingly. Particularly, when the charging electric power is switched as shown in FIG. 11, the impedance of the power receiving side with respect to the power transmitting side further varies before and after changing the charging electric power, so it can influence the power transfer efficiency.

Figure 12:
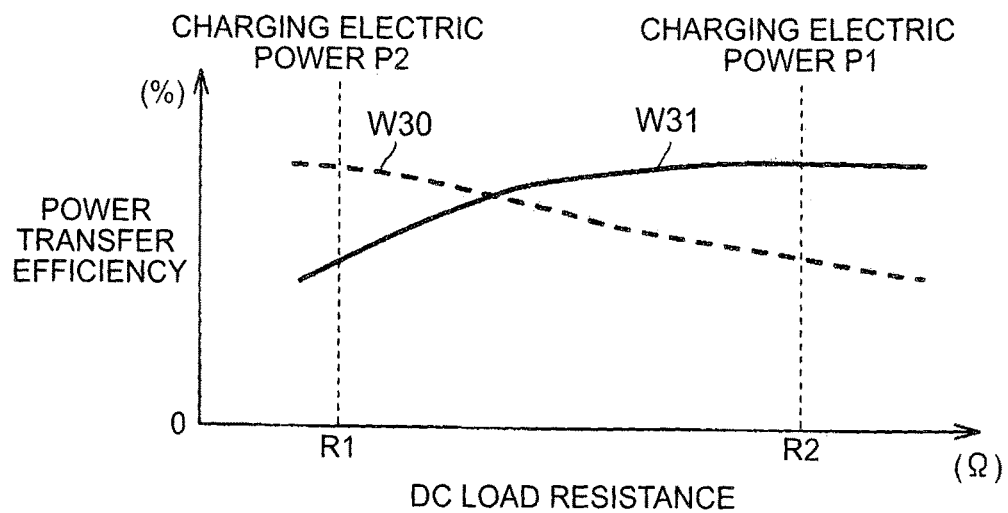
FIG. 12 is a graph for illustrating an example of a variation in power transfer efficiency with a variation in power receiving-side load resistance in the vehicle power supply system.

FIG. 12 is a graph that shows an example of a variation in power transfer efficiency with a variation in load resistance of the power receiving side. In FIG. 12; the abscissa axis represents a load resistance (impedance) of the electrical storage device, and the ordinate axis represents a power transfer efficiency. For the sake of easy understanding, in FIG. 12, the SOC is set in a constant state, so a variation in load resistance is due to a variation in charging electric power.

Generally, the load resistance of the power receiving side is smaller when the charging electric power is large (charging electric power P2 in FIG. 12) than when the charging electric power is small (charging electric power P1 in FIG. 12). When the impedance is matched with the use of the vehicle-side matching transformer in a state of the charging electric power P2 at the time of design, the power transfer efficiency decreases at the time when the charging, electric power is decreased to P1 as indicated by the dashed line W30 in FIG. 12. On the contrary, when the impedance is matched with the use of the vehicle-side matching transformer in a state of the charging electric power P1 at the time of design, the power transfer efficiency at the charging electric power P2 decreases as indicated by the solid line W31 in FIG. 12.

Thus, when the charging electric power is switched in charging operation as shown in FIG. 11, it is possible to prevent a decrease in power transfer efficiency by appropriately switching the vehicle-side matching transformer on the basis of a variation in charging electric power.

In the present embodiment, the description is made on an example of the configuration that an impedance variation due to the vehicle height and the positional deviation is adjusted with the use of the matching transformer 260 of the power transmitting device 200 and an impedance variation due to a load variation during charging is adjusted with the use of the matching transformer 170 of the vehicle 100. However, it is possible to adjust the impedance variations only with the use of the matching transformer of one of the power transmitting device 200 and the vehicle 100. However, the impedance variation due to the vehicle height and the positional deviation is relatively larger than the impedance variation due to a load variation during charging, so a wide adjustment range is required for the matching transformer that handles the impedance variation due to the vehicle height and the positional deviation. On the other hand, the matching transformer that handles the impedance variation due to a load variation during charging is required to have a minute adjustment capability.

Therefore, if both impedance variations are handled by one of the matching transformer of the power transmitting device 200 and the matching transformer of the vehicle 100, it is required to have a minute adjustment capability and a wide adjustment range, so the matching transformer may be large in size or may be high in cost. Therefore, in terms of reducing the size of the device and suppressing an increase in cost, as described above, it is more desirable to adjust the impedance variation due to the relative position between the power transmitting device and the vehicle and the impedance variation due to load fluctuations during charging with the use of the corresponding individual matching transformers.

FIG. 13 shows an example of a map of combinations of the inductance of the reactor and the capacitance of the capacitor in the matching transformer 260 of the power transmitting device 200.

In the example of the map shown in FIG. 13, nine different combinations of inductance and capacitance are set in correspondence with classifications of the vehicle height and positional deviation. For example, when the vehicle height detected by the vehicle height sensor 155 is H2 and the positional deviation detected on the basis of the voltage VC from the voltage detecting unit 181 is G1, the matching transformer is selected such that the combination of inductance and capacitance is (L, C)=(L12, C12).

The map shown in FIG. 13 is one example. The number of classifications and combinations of inductance and capacitance are selected as needed in consideration of cost, device size, and the like.

Figure 14:
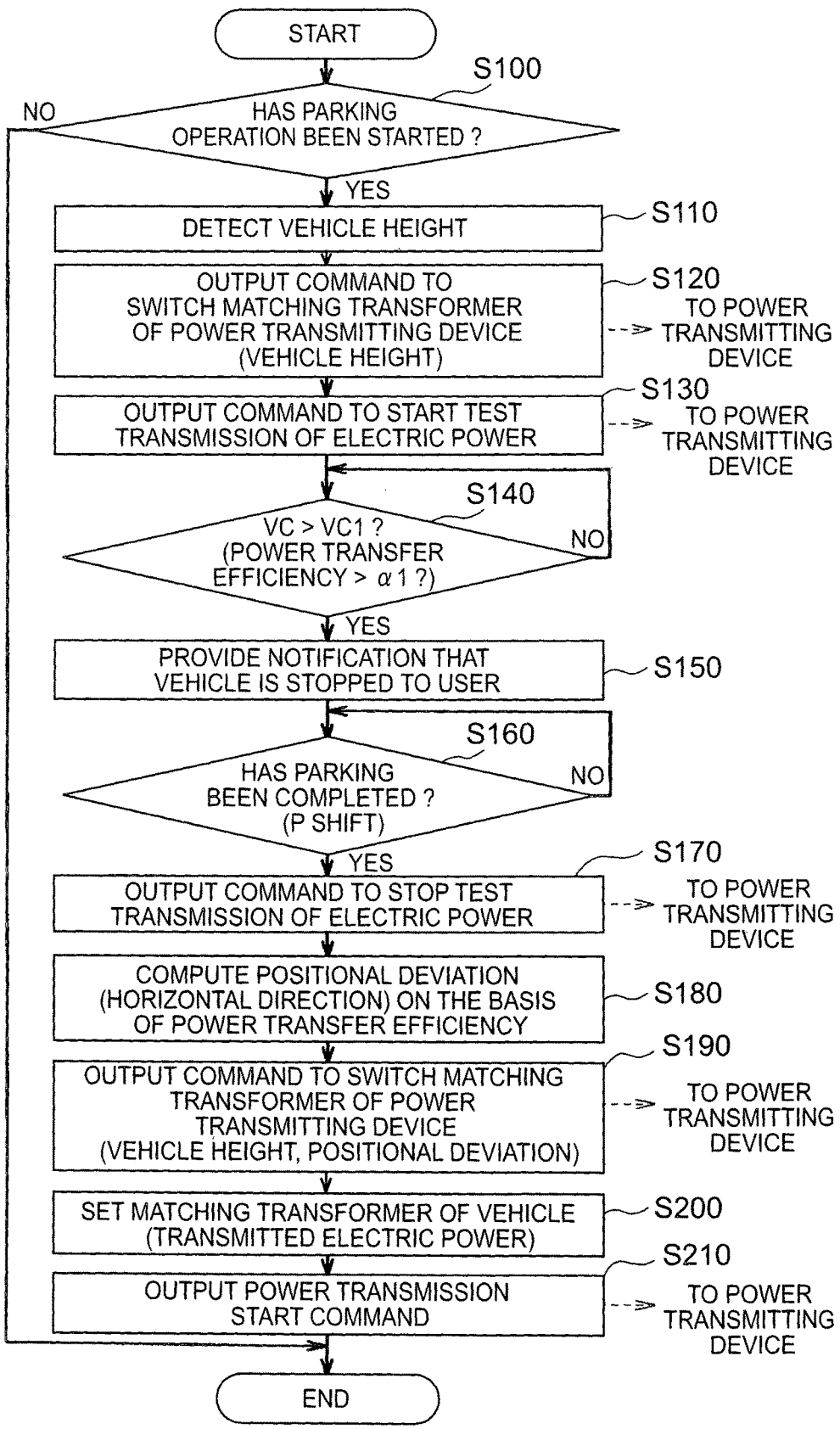
FIG. 14 is a flowchart for illustrating impedance adjustment control that is executed by a vehicle ECU before the electrical storage device is charged in the embodiment.

FIG. 14 and FIG. 15 are flowcharts for illustrating an impedance adjustment control process that is executed by the vehicle ECU 300. FIG. 14 shows control before charging of the electrical storage device 190 of the vehicle 100 is started, and more specifically shows control in the case where the vehicle, 100 is positioned and stopped with respect to the power transmitting unit 220. On the other hand, FIG. 15 shows control after charging of the electrical storage device 190 is started.

Steps in the flowcharts shown in FIG. 14 and FIG. 15 are implemented by executing programs prestored in the vehicle ECU 300 and are called from a main routine at predetermined intervals or in response to fulfillment of a predetermined condition. Alternatively, for part of steps, the processes may be implemented by constructing exclusive hardware (electronic circuit).

First, as shown in FIG. 1 and FIG. 14, the vehicle ECU 300 determines in step (hereinafter, step is abbreviated as "S") 100 whether parking operation for parking the vehicle to a parking area in which the power transmitting unit 220 is installed has been started.

When the parking operation has not been started (NO in S100), the following process is not required, so the vehicle ECU 300 ends the process.

When the parking operation has been started (YES in S100), the process proceeds to S110, and the vehicle ECU 300 detects the vehicle height on the basis of the detected value from the vehicle height sensor 155. Then, in S120, the vehicle ECU 300 determines the combination of the inductance and capacitance of the matching transformer 260 using the map as shown in FIG. 13 on the basis of the detected vehicle height. After that, the vehicle ECU 300 outputs, to the power transmitting device 200, a command to switch the matching transformer 260. Although not shown in FIG. 14, in response to the matching transformer switching command from the vehicle ECU 300, the power transmitting ECU 240 adjusts the matching transformer 260.

In S130, the vehicle ECU 300 outputs, to the power transmitting device 200, a command to cause the power transmitting device 200 to transmit electric power lower than electric power in the case where full-scale charging of the electrical storage device 190 is performed (hereinafter, also referred to as "test transmission of electric power") in order to align the power receiving unit 110 with the power transmitting unit 220 and detect the positional deviation between the power receiving unit 110 and the power transmitting unit 220. Although not shown in FIG. 14, the power transmitting ECU 240 carries out test transmission of electric power in response to the command to start test transmission of electric power.

After that, while the parking operation is being continued, the vehicle ECU 300 determines in S140 whether the voltage VC from the voltage detecting unit 181 has exceeded a predetermined threshold VC1, that is, whether the horizontal positional deviation between the power receiving unit 110 and the power transmitting unit 220 is smaller than or equal to a predetermined amount. The determination in S130 may be configured to determine whether the power transfer efficiency, instead of the voltage VC, has exceeded a predetermined threshold α1.

When the horizontal positional deviation between the power receiving unit 110 and the power transmitting unit 220 is not smaller than or equal to the predetermined amount (NO in S140), the process returns to S140, and the user's parking operation is continued.

When the horizontal positional deviation between the power receiving unit 110 and the power transmitting unit 220 is smaller than or equal to the predetermined amount (YES in S140), the process proceeds to S150, and the vehicle ECU 300 provides a notification that the vehicle is stopped to the user. In this way, the vehicle ECU 300 assists alignment of the power receiving unit 110 with the power transmitting unit 220 in the user's parking operation.

In S160, the vehicle ECU 300 determines whether the parking operation has been completed. Completion of the parking operation is, for example, determined on the basis of the fact that a shift range is set to a parking position (P shift), the fact that a side brake is operated, the fact that an ignition switch is turned off, or the like.

When the parking operation has not been completed (NO in S160), the process returns to S160, and the vehicle ECU 300 continues to determine whether the parking operation has been completed.

When the parking operation has been completed (YES in S160), the process proceeds to S170, and the vehicle ECU 300 outputs, to the power transmitting device 200, a command to stop test transmission of electric power. In response to this, the power transmitting ECU 240 stops test transmission of electric power.

The vehicle ECU 300 computes the horizontal positional deviation (coil gap) between the power transmitting unit 220 and the power receiving unit 110 using the map as shown in FIG. 10 on the basis of the setting of the currently selected matching transformer 260 of the power transmitting device 200 and the power transfer efficiency at the time of completion of parking. Furthermore, in S190, the vehicle ECU 300 determines the combination of the inductance and capacitance of the matching transformer 260 using the map as shown in FIG. 13 on the basis of the computed positional deviation and the vehicle height from the vehicle height sensor 155, and outputs, to the power transmitting device 200, a command to switch the matching transformer 260. In response to this, the power transmitting ECU 240 adjusts the matching transformer 260.

After that, in S200, the vehicle ECU 300 determines a transmitted electric power on the basis of the SOC of the electrical storage device 190 as shown in FIG. 11, and adjusts the matching transformer 170 of the vehicle 100 in correspondence with the transmitted electric power. In S210, the vehicle ECU 300 outputs, to the power transmitting device 200, a command to start transmitting electric power for charging the electrical storage device 190 using the transmitted electric power determined in S200. The power transmitting ECU 240 starts power transmitting operation at the set transmitted electric power in response to the command, and, in the vehicle 100, charging of the electrical storage device 190 is started using a received electric power.

Next, impedance adjustment control during charging will be described with reference to FIG. 15. In S300, the vehicle ECU 300 determines whether charging operation is currently being carried out.

When charging operation is not being carried out (NO in S300), the following process does not need to be executed, so the vehicle ECU 300 ends the process.

When charging operation is being carried out (YES in S300), the process proceeds to S310, and the vehicle ECU 300 determines whether the electrical storage device 190 is fully charged, that is, whether the SOC has exceeded a threshold S2 that indicates a full charge state (SOC>S2).

When the electrical storage device 190 is not fully charged (NO in S310), the process proceeds to S320, and the vehicle ECU 300 determines whether the SOC has exceeded a threshold S1 for decreasing the transmitted electric power (S1<SOC≤S2).

When the SOC has exceeded the threshold S1 (YES in S320), the process proceeds to S321, and the vehicle ECU 300 outputs, to the power transmitting device 200, a switching command for decreasing the transmitted electric power from P2 to P1. The power transmitting ECU 240 switches the transmitted electric power in response to the switching command.

In S322, the vehicle ECU 300 adjusts the impedance with the use of the matching transformer 170 of the vehicle 100 such that the impedance corresponds to the decreased transmitted electric power. After that, the process returns to S310, and the vehicle ECU 300 continues to charge the electrical storage device 190 with the electric power received from the power transmitting device 200.

On the other hand, when the SOC is lower than or equal to the threshold S1 (NO in S320), the process proceeds to S330, and it is determined whether the power transfer efficiency during receiving of electric power has decreased below a predetermined threshold α2.

When the power transfer efficiency is higher than or equal to the threshold α2 (NO in S330), the process returns to S310, and the charging operation is continued.

When the power transfer efficiency is lower than the threshold α2 (YES in S330), the vehicle ECU 300 determines that the vehicle height may have varied due to, for example, occupant's getting on or off of the vehicle or loading or unloading of baggage, while the charging operation is being carried out or a stopped location may have deviated from the initial location due to some cause.

Therefore, in order to adjust the impedance again, the vehicle ECU 300 proceeds with the process to S340, and outputs, to the power transmitting device 200, a command to temporarily stop transmission of electric power. Then, the vehicle ECU 300 computes the positional deviation between the power receiving unit 110 and the power transmitting unit 220 by comparing the power transfer efficiency calculated in S330 with the map as shown in FIG. 10 (S350), and detects the vehicle height on the basis of the signal from the vehicle height sensor 155 (S360).

The vehicle ECU 300 determines the combination of the inductance and capacitance of the matching transformer 260 of the power transmitting device 200 using these pieces of information acquired in S350, S360 and the map shown in FIG. 13, and outputs, to the power transmitting device 200, a command to switch the matching transformer 260. Then, in S370, the vehicle ECU 300 outputs a power transmission start command to the power transmitting device 200, and resumes transmission of electric power from the power transmitting device 200. After that, the process returns to S310, and the charging operation is continued.

On the other hand, when the SOC is higher than the threshold S2 and the electrical storage device 190 is fully charged (YES in S310), the process proceeds to S390, and, in order to end the charging operation, the vehicle ECU 300 outputs a power transmission stop command to the power transmitting device 200. The power transmitting device 200 stops power transmitting operation in response to the power transmission stop command.

By executing control in accordance with the above-described process, it is possible to suppress a decrease in power transfer efficiency in the contactless power-supply system. Particularly, when the power transfer efficiency decreases due to a variation in vehicle height due to occupant's getting on or off of the vehicle, or the like, or a variation in positional deviation during charging operation, by allowing the matching transformer of the power transmitting device to be adjustable from the vehicle, it is possible to classify the adjustment range of the matching transformer of the power transmitting device and the adjustment range of the matching transformer of the vehicle, so it is possible to reduce the size of the matching transformer of the vehicle and suppress an increase in cost.

The invention claimed is:

1. A vehicle that contactlessly receives electric power from a power transmitting device of which an impedance is adjustable by a first impedance adjustment unit, comprising:
   a power receiving unit configured to contactlessly receive electric power from the power transmitting device;
   an electrical storage device configured to store electric power received by the power receiving unit;
   an electronic control unit configured to control charging operation of the electrical storage device, the electronic control unit being configured to output a command to adjust the first impedance adjustment unit to the power transmitting device, and the electronic control unit being configured to set an impedance of the first impedance adjustment unit based on a power transfer efficiency between the power transmitting device and the power receiving unit while the electrical storage device is being charged; and a second impedance adjustment unit configured to adjust an impedance between the power receiving unit and the electrical storage device, wherein the power transmitting device is configured to use one of a first electric power and a second electric power lower than the first electric power as a transmitted electric power for charging the electrical storage device, the electronic control unit is configured to cause the power transmitting device to output the first electric power when a value indicating a state of charge of the electrical storage device is lower than or equal to a predetermined threshold, and the electronic control unit is configured to cause the power transmitting device to output the second electric power and set an impedance of the second impedance adjustment unit based on the transmitted electric power from the power transmitting device, when the value indicating the state of charge exceeds the threshold.

2. The vehicle according to claim 1, further comprising: a detecting unit configured to detect a vertical distance between the power receiving unit and a ground surface, wherein the electronic control unit is configured to set the impedance of the first impedance adjustment unit based on the distance detected by the detecting unit.

3. The vehicle according to claim 1, wherein the electronic control unit is configured to compute a horizontal positional deviation between the power receiving unit and the power transmitting device based on the power transfer efficiency while the electrical storage device is being charged, and the electronic control unit is configured to set the impedance of the first impedance adjustment unit based on a computed positional deviation.

4. The vehicle according to claim 1, further comprising: a detecting unit configured to detect a vertical distance between the power receiving unit and a ground surface, wherein the electronic control unit is configured to cause the power transmitting device to transmit an electric power, the electric power is lower than a transmitted electric power at a time when the electrical storage device is charged, in advance of charging of the electrical storage device, and the electronic control unit is configured to set the impedance of the first impedance adjustment unit at a time of starting charging of the electrical storage device based on the power transfer efficiency when the lower electric power is used and the distance.

5. The vehicle according to claim 1, further comprising: a detecting unit configured to detect a vertical distance between the power receiving unit and a ground surface, wherein the electronic control unit is configured to assist alignment of the power receiving unit with the power transmitting device based on the power transfer efficiency between the power transmitting device and the power receiving unit while causing the power transmitting device to transmit an electric power, the electric power is lower than a transmitted electric power at a time when the electrical storage device is charged, and the electronic control unit is configured to set the impedance of the first impedance adjustment unit at the time of causing the power transmitting device to transmit the lower electric power based on the distance.

6. The vehicle according to claim 1, wherein the power transmitting device includes a power transmitting unit configured to contactlessly supply electric power, and a difference between a natural frequency of the power transmitting unit and a natural frequency of the power receiving unit is smaller than or equal to ±10% of one of the natural frequency of the power transmitting unit and the natural frequency of the power receiving unit.

7. The vehicle according to claim 1, wherein the power transmitting device includes a power transmitting unit configured to contactlessly supply electric power, and a coupling coefficient between the power transmitting unit and the power receiving unit is smaller than or equal to 0.1.

8. The vehicle according to claim 1, wherein the power transmitting device includes a power transmitting unit configured to contactlessly supply electric power, and the power receiving unit is configured to receive electric power from the power transmitting unit through at least one of a magnetic field and an electric field, the magnetic field is between the power receiving unit and the power transmitting unit, the magnetic field oscillating at a predetermined frequency, the electric field is between the power receiving unit and the power transmitting unit, and the electric field oscillating at a predetermined frequency.

9. A contactless power supply system that contactlessly supplies electric power, comprising:

a power transmitting device including a power supply unit, a power transmitting unit and an impedance adjustment unit, the power transmitting unit being configured to contactlessly supply electric power, the electric power being supplied from the power supply unit to a power receiving unit, the impedance adjustment unit being electrically connected between the power supply unit and the power transmitting unit, and the impedance adjustment unit being configured to adjust an impedance between the power supply unit and the power transmitting unit; and a vehicle including the power receiving unit, an electrical storage device and an electronic control unit, the power receiving unit being configured to contactlessly receive electric power from the power transmitting device, the electrical storage device being configured to store electric power received by the power receiving unit, the electronic control unit being configured to control charging operation of the electrical storage device, the electronic control unit being configured to output a command to adjust the impedance adjustment unit to the power transmitting device, and the electronic control unit being configured to set an impedance of the impedance adjustment unit based on a power transfer efficiency between the power transmitting unit and the power receiving unit while the electrical storage device is being charged; and a second impedance adjustment unit configured to adjust an impedance between the power receiving unit and the electrical storage device, wherein the power transmitting device is configured to use one of a first electric power and a second electric power lower than the first electric power as a transmitted electric power for charging the electrical storage device, the electronic control unit is configured to cause the power transmitting device to output the first electric power when a value indicating a state of charge of the electrical storage device is lower than or equal to a predetermined threshold, and the electronic control unit is configured to cause the power transmitting device to output the second electric power and set an impedance of the second impedance adjustment unit based on the transmitted electric power from the power transmitting device, when the value indicating the state of charge exceeds the threshold.

* * * * *